(12) United States Patent
Takahashi et al.

(10) Patent No.: US 10,895,513 B2
(45) Date of Patent: Jan. 19, 2021

(54) PRESSURE DETECTION SIGNAL PROCESSING DEVICE, ENGINE CONTROL SYSTEM, AND NON-TRANSITORY COMPUTER READABLE MEDIUM STORING A PROGRAM

(71) Applicant: MIKUNI CORPORATION, Tokyo (JP)

(72) Inventors: Ren Takahashi, Iwate (JP); Katsuhiko Fukui, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/687,629

(22) Filed: Nov. 18, 2019

(65) Prior Publication Data

US 2020/0158588 A1    May 21, 2020

(30) Foreign Application Priority Data

Nov. 19, 2018  (JP) .................................. 2018-216137

(51) Int. Cl.
*G01L 23/22* (2006.01)
*G01L 9/08* (2006.01)
*F02D 41/14* (2006.01)
*G01L 23/10* (2006.01)
(Continued)

(52) U.S. Cl.
CPC .......... *G01L 23/10* (2013.01); *F02D 41/1439* (2013.01); *F02D 41/1444* (2013.01);
(Continued)

(58) Field of Classification Search
CPC ....... G01L 23/10; G01L 23/22; G01L 23/222; G01L 27/005; G01C 5/02; F02D 41/1439;
(Continued)

(56) References Cited

U.S. PATENT DOCUMENTS 4,392,082 A * 7/1983 Harada .................... G01L 23/22
313/118
5,062,294 A * 11/1991 Iwata ..................... G01L 27/007
73/114.21
(Continued)

FOREIGN PATENT DOCUMENTS

JP      2009115484       5/2009
WO   WO-2005113969 A1 * 12/2005 ........... G01L 27/005
WO   WO-2019084589 A1 *  5/2019 ........... F02D 35/024

*Primary Examiner* — Mahmoud Gimie
(74) *Attorney, Agent, or Firm* — JCIPRNET

(57) ABSTRACT

A pressure detection signal processing device, engine control system, and non-transitory computer readable medium storing a program are provided. A current-voltage conversion part that converts a current signal corresponding to charge generated by a piezoelectric element in accordance with received pressure into a voltage signal, and digital signal processing parts that perform correction for removing a drift caused by a leakage current of the piezoelectric element on the voltage signal through digital signal processing are provided. The digital signal processing parts include a differentiation processing part that performs differentiation processing on the voltage signal, an integration processing part that performs integration processing on the signal having been subjected to the differentiation processing, and an integration processing part that further performs integration processing on the signal having been subjected to the integration processing.

9 Claims, 8 Drawing Sheets

(51) Int. Cl.
*G07C 5/02* (2006.01)
*F02P 5/15* (2006.01)
*F02D 41/32* (2006.01)
*F02P 5/04* (2006.01)

(52) U.S. Cl.
CPC .............. *G01L 9/08* (2013.01); *G01L 23/22* (2013.01); *G01L 23/222* (2013.01); *G07C 5/02* (2013.01); *F02D 41/32* (2013.01); *F02D 2200/024* (2013.01); *F02D 2200/101* (2013.01); *F02P 5/045* (2013.01); *F02P 5/1502* (2013.01)

(58) Field of Classification Search
CPC ................ F02D 41/1444; F02D 41/32; F02D 2200/024; F02D 2200/101; F02P 5/045; F02P 5/1502

USPC ........................................................ 701/115
See application file for complete search history.

(56) References Cited

U.S. PATENT DOCUMENTS

| | | | | |
|---|---|---|---|---|
| 5,371,472 | A | * | 12/1994 | Wohlstreicher ........... G01L 1/16 330/107 |
| 2013/0275070 | A1 | * | 10/2013 | Oomi ...................... G01L 23/10 702/98 |
| 2017/0131170 | A1 | * | 5/2017 | Nakamura ............... G01L 23/10 |
| 2017/0146421 | A1 | * | 5/2017 | Nakamura ................ G01L 9/08 |
| 2017/0153161 | A1 | * | 6/2017 | Yomoyama ........... G01L 23/222 |
| 2019/0056282 | A1 | * | 2/2019 | Kanamori ............... G01L 23/22 |
| 2019/0086281 | A1 | * | 3/2019 | Nakamura ............ G01L 27/005 |

* cited by examiner

PRESSURE DETECTION SIGNAL PROCESSING DEVICE, ENGINE CONTROL SYSTEM, AND NON-TRANSITORY COMPUTER READABLE MEDIUM STORING A PROGRAM

CROSS-REFERENCE TO RELATED APPLICATION

This application claims the priority of Japan patent application serial no. 2018-216137, filed on Nov. 19, 2018. The entirety of the above-mentioned patent application is hereby incorporated by reference herein and made a part of this specification.

BACKGROUND

Technical Field

The present disclosure relates to a pressure detection signal processing device performing signal processing on a pressure detection signal of a pressure sensor including a piezoelectric element, an engine control system, and non-transitory computer readable medium storing a program.

Description of Related Art

For example, a configuration including a charge amplifier has been proposed for a signal processing circuit for a pressure detection signal which is output from a pressure sensor configured to include a piezoelectric element that outputs charge in accordance with the intensity of received pressure. The charge amplifier is configured such that a feedback resistor and a feedback capacitance are connected to an operation amplifier in parallel, and the operation amplifier is connected in a negative feedback manner.

In a pressure detection signal processing circuit including a charge amplifier, a leakage current of a piezoelectric element causes drifting of a pressure detection signal, and thus it is necessary to provide a correction circuit for removing the influence of the drift, and the like.

Consequently, a circuit configuration in which a DC isolator is interposed between a piezoelectric element and a charge amplifier has been proposed (see, for example, Japanese Patent Laid-Open No. 2009-115484 (Pages 2 to 7, a first drawing)). The DC isolator blocks a DC component to allow a pressure detection signal to pass and is constituted by a capacitor. That is, a leakage current of the piezoelectric element acts to cause drifting, but is also regarded as a DC component of which the size is maintained stably even for a long period of time. Therefore, the DC component is blocked by a capacitor.

However, according to the configuration disclosed in Japanese Patent Laid-Open No. 2009-115484, the capacitance of a capacitor which is a DC isolator depends on the magnitude of an impedance of a piezoelectric element. For this reason, in a case where the impedance of the piezoelectric element is small, there is a problem in that the capacitance of the capacitor is increased. When the capacitance of the capacitor is increased, there is a problem in that the mounted area of a capacitor occupied in the surface of an electronic substrate is increased.

SUMMARY

According to an embodiment, there is provided a pressure detection signal processing device that performs signal processing on an output signal of a pressure sensor including a piezoelectric element generating charge according to received pressure, the pressure detection signal processing device including an current-voltage conversion part (IV conversion part) which converts a current signal corresponding to the charge into a voltage signal, and a digital signal processing part which performs correction for removing a drift of the piezoelectric element on the voltage signal through digital signal processing.

According to one of the embodiments of the present disclosure, the digital signal processing part may include a differentiation processing part which performs differentiation processing on the voltage signal, a first integration processing part which performs integration processing on the signal having been subjected to the differentiation processing, and a second integration processing part which performs integration processing on the signal having been subjected to the integration processing.

According to another embodiment, there is provided a pressure detection signal processing device that performs signal processing on an output signal of a pressure sensor including a piezoelectric element generating charge according to received pressure, the pressure detection signal processing device including an current-voltage conversion part (IV conversion part) which converts a current signal corresponding to the charge into a voltage signal, an extraction part which extracts a component in a specific frequency band of the voltage signal, and a digital signal processing part which performs correction processing for removing a drift of the piezoelectric element through digital signal processing on the basis of the voltage signal and an extracted signal which has been extracted.

According to one of the embodiments of the present disclosure, the digital signal processing part may include a subtraction processing part which obtains a subtraction signal indicating a result of a subtraction calculation with respect to the voltage signal and the extracted signal, and an integration processing part which performs integration processing on the subtraction signal.

In the device of this embodiment, the extraction part may be realized by a low-pass filter that extracts a component in a predetermined low frequency band. In addition, the IV conversion part may include an operation amplifier which is connected in a negative feedback manner using a resistor.

In addition, an engine control system including the above-described pressure detection signal processing device and a control part that controls an engine on the basis of an output signal from the pressure detection signal processing device may be provided. In addition, the digital signal processing part may change a cutoff frequency of the low-pass filter in accordance with a rotational speed of the engine.

According to still another embodiment, there is provided non-transitory computer readable medium storing a program for causing a pressure detection signal device that performs signal processing on an output signal of a pressure sensor including a piezoelectric element generating charge according to received pressure to realize a signal processing function of performing correction processing for removing a drift of the piezoelectric element on a voltage signal converted from a current signal corresponding to the charge by an current-voltage conversion part (IV conversion part).

According to one of the embodiments of the present disclosure, the signal processing function may include a differentiation processing function of performing differentiation processing on the voltage signal, a first integration function of performing integration processing on the signal having been subjected to the differentiation processing, and a second integration function of performing integration processing on the signal having been subjected to the integration processing.

According to still another embodiment, there is provided non-transitory computer readable medium storing a program for causing a pressure detection signal device that performs signal processing on an output signal of a pressure sensor including a piezoelectric element generating charge according to received pressure to realize a signal processing function of performing correction processing for removing a drift of the piezoelectric element on the basis of a voltage signal converted from a current signal corresponding to the charge by an current-voltage conversion part (IV conversion part) and an extracted signal obtained by extracting a specific frequency component of the voltage signal.

The signal processing function in another program may include a subtraction processing function of obtaining a subtraction signal indicating a result of a subtraction calculation with respect to the voltage signal and the extracted signal, and an integration function of performing integration processing on the subtraction signal.

DESCRIPTION OF THE EMBODIMENTS

The disclosure provides a pressure detection signal processing device, an engine control system, and non-transitory computer readable medium storing a program which are capable of obtaining a highly accurate pressure detection signal by removing a drift of a piezoelectric element with a simple configuration.

According to the disclosure, it is possible to obtain an effect of providing a pressure detection signal processing device, an engine control system, and non-transitory computer readable medium storing a program which are capable of achieving high-accuracy pressure detection by removing a drift of a piezoelectric element with a simple configuration.

Hereinafter, embodiments of the disclosure will be described with reference to the accompanying drawings. The embodiments of the disclosure to be described below are examples. The disclosure is not limited to the following embodiments, and various modifications and changes can be made to the following embodiments.

(Outline of Engine Control System 300)

Figure 1:
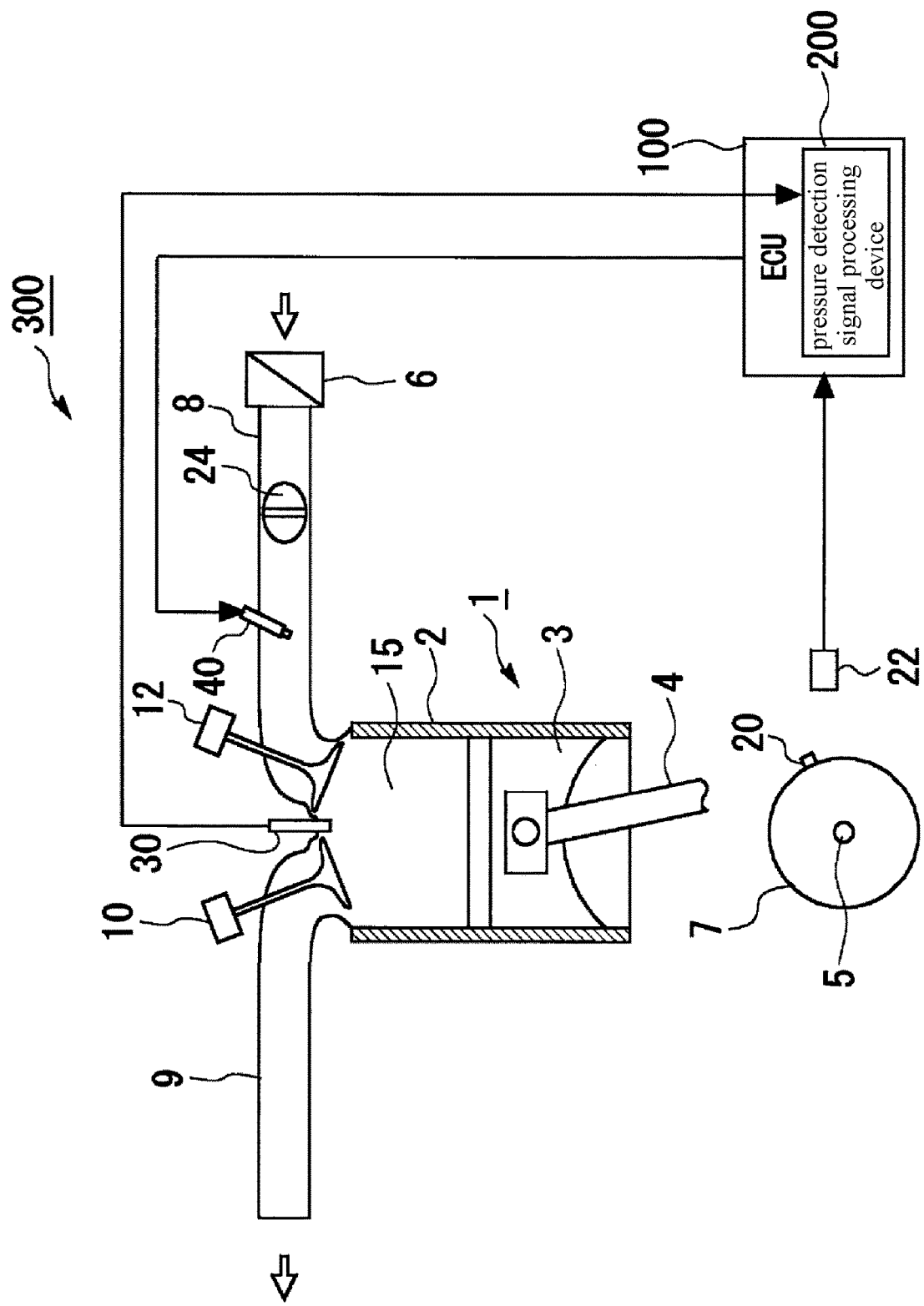
FIG. 1 is a schematic configuration diagram of an engine control system.

FIG. 1 is a schematic configuration diagram of an engine control system 300 including an engine 1 and an electronic control unit (ECU) 100. The engine control system 300 controls an engine using a pressure detection signal having been subjected to signal processing by a pressure detection signal processing device 200. The pressure detection signal is a signal which is output from a pressure sensor 30. Meanwhile, in FIG. 1, an ignition plug is not shown in order to facilitate the understanding of the description.

The engine 1 includes a cylinder 2 and a piston 3 which is fitted inside the cylinder 2 so as to be slidable in a vertical direction. One end side of a connecting rod 4 is connected to the piston 3, and the other end side of the connecting rod 4 is connected to a crankshaft 5. A flywheel 7 is rotatably connected to an end of the crankshaft 5 on a transmission side not shown in the drawing. A reluctor 20 which is a protrusion constituted by a magnetic body is formed in a predetermined angular region on the outer periphery of the flywheel 7.

An electromagnetic pickup 22 disposed facing the crankshaft 5 outputs a pulse of a positive voltage when the reluctor 20 approaches thereto, and outputs a pulse of a negative voltage when the reluctor 20 recedes therefrom. When a pulse is shaped by a known pulse shaping circuit so that one rectangular pulse is output on the basis of pulse signals of positive and negative electrodes, one rectangular pulse is output whenever the flywheel 7 is rotated once.

Accordingly, in one cycle of "intake-compression-combustion-exhaust", the crankshaft 5 is rotated by 720 degrees, and thus a two-pulse rectangular signal (engine rotation signal) is output from the electromagnetic pickup 22 in one cycle. In this manner, the electromagnetic pickup 22 serves as a crank angle sensor that detects a rotation angle of the crankshaft 5.

As a result, it is possible to obtain a rotational speed of the engine 1 on the basis of an engine rotation signal which is output from the electromagnetic pickup 22. In addition, a position where the reluctor 20 is formed on the outer periphery of the flywheel 7 can be set to be an appropriate angular region, and a timing when an ignition control signal is applied to the ignition plug to ignite fuel on the basis of the engine rotation signal output from the electromagnetic pickup 22 can be set to be a desired timing. The desired timing is a timing corresponding to a top dead center (TDC), an angle before the top dead center (BTDC), or an angle after (ATDC).

In addition, an intake pipe 8 and an exhaust pipe 9 are connected to a cylinder head in an upper portion of the cylinder 2. The inside of the intake pipe 8 serves as an intake passage for taking fresh air into the combustion chamber 15 from the outside. In addition, an air cleaner 6 for removing dust in fresh air and the like, a throttle valve 24 for adjusting the amount of fresh air suctioned, an injector 40 for injecting fuel, and the like are disposed in the intake passage from an upstream side. In addition, a timing when fresh air is taken into the combustion chamber 15 is controlled through a valve opening operation and a valve closing operation of the intake valve 12 which is biased in a valve closing direction by a spring not shown in the drawing.

In addition, the pressure sensor 30 detects a combustion pressure which is a pressure of the combustion chamber 15 and outputs a pressure detection signal indicating the detected combustion pressure. The pressure sensor 30 is disposed at the top of the cylinder head so that the tip end thereof faces the inside of the combustion chamber. Meanwhile, a position where the pressure sensor 30 is mounted is not limited to the position shown in FIG. 1. Similarly, an ignition plug not shown in the drawing is also disposed at an appropriate position on the cylinder head so that the tip end thereof faces the inside of the combustion chamber. It is possible to configure a structure in which the pressure sensor 30 is integrally provided inside the ignition plug, or the pressure sensor 30 and the ignition plug can be configured as separate bodies.

On the other hand, the inside of the exhaust pipe 9 serves as an exhaust passage for discharging exhaust gas from the combustion chamber 15. In addition, a timing when exhaust gas is discharged from the inside of the combustion chamber 15 is controlled through a valve opening operation and a valve closing operation of the exhaust valve 10 which is biased in a valve closing direction by a spring not shown in the drawing.

Signals from the electromagnetic pickup 22, the pressure sensor 30, and the like are input to the ECU 100 that controls the operation of the engine 1. A rectangular pulse signal according to the rotation of the engine is input from the electromagnetic pickup 22. A pressure detection signal is input from the pressure sensor 30. On the other hand, the ECU 100 controls the injection of fuel of the injector 40 and controls the ignition of the ignition plug.

In addition, a pressure detection signal from the pressure sensor 30 is subjected to signal processing by the pressure detection signal processing device 200. The ECU 100 performs control of fuel injection by the injector 40 (an amount of fuel injected, an injection time) and ignition time control for the ignition plug on the basis of the engine rotation signal and the pressure detection signal having been subjected to signal processing by the pressure detection signal processing device 200.

A vertical reciprocation of the piston 3 inside the cylinder 2 is converted into a rotation operation of the crankshaft 5. The rotation operation of the crankshaft 5 is transmitted to a driving wheel through a transmission, and a vehicle (two-wheeled, four-wheeled) moves forward by repeating a process of "intake→compression→combustion→exhaust".

Meanwhile, FIG. 1 is a configuration example of the engine 1 and the ECU 100 that controls the engine 1, and for example, the ECU 100 can also control the engine 1 with reference to the temperature of intake air of the engine 1, the temperature of cooling water, the concentration of oxygen in exhaust gas, the opening degree of a throttle, and the like, in addition to the engine rotation signal and the pressure detection signal.

(Functional Configuration of ECU 100)

Figure 2:
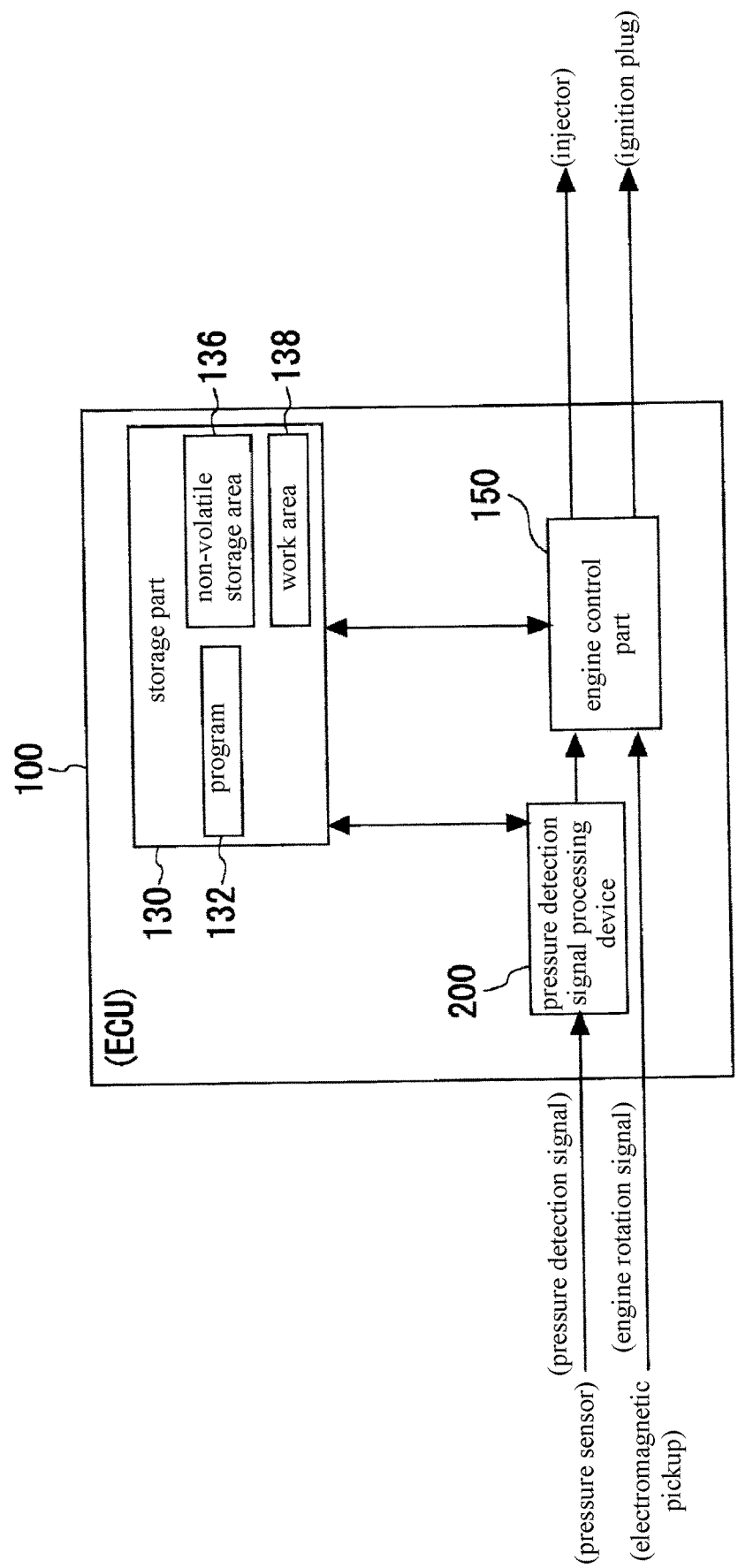
FIG. 2 is a functional configuration diagram of an ECU.

FIG. 2 is a functional configuration diagram showing the function of the ECU 100. The ECU 100 includes a storage part 130, an engine control part 150, and a pressure detection signal processing device 200. The storage part 130 includes a program 132, a non-volatile storage area 136, and a work area 138. The work area 138 is a temporary storage region for temporarily storing various parameters in an arithmetic process, and the non-volatile storage area 136 is a storage region for storing various parameters used in arithmetic processing in a non-volatile manner.

The engine control part 150 obtains the amount of fuel injected on the basis of a pressure detection signal which is output from the pressure detection signal processing device 200, and the like and controls the injector 40 at a timing based on a fuel injection signal corresponding to the obtained amount of fuel injected and the engine rotation signal output from the electromagnetic pickup 22. Thereby, the injector 40 injects fuel using the amount of fuel to be injected according to the control of the engine control part 150.

The engine control part 150 controls the ignition plug by determining an ignition time on the basis of the engine rotation signal received from the electromagnetic pickup 22. In addition, the engine control part 150 can also control an ignition time on the basis of the pressure detection signal received from the pressure detection signal processing device 200 in addition to the engine rotation signal received from the electromagnetic pickup 22.

The functional configuration of the ECU 100 shown in FIG. 2 is just an example. The ECU 100 may adopt other functional configurations. It is possible to perform not only fuel injection control and ignition time control but also the detection, control, and the like of various parameters such as knocking detection, misfire detection, and combustion speed calculation by using the processed pressure detection signal which is output from the pressure detection signal processing device 200.

Pressure Detection Signal Processing Device 200 According to First Embodiment (Configuration)

Figure 3:
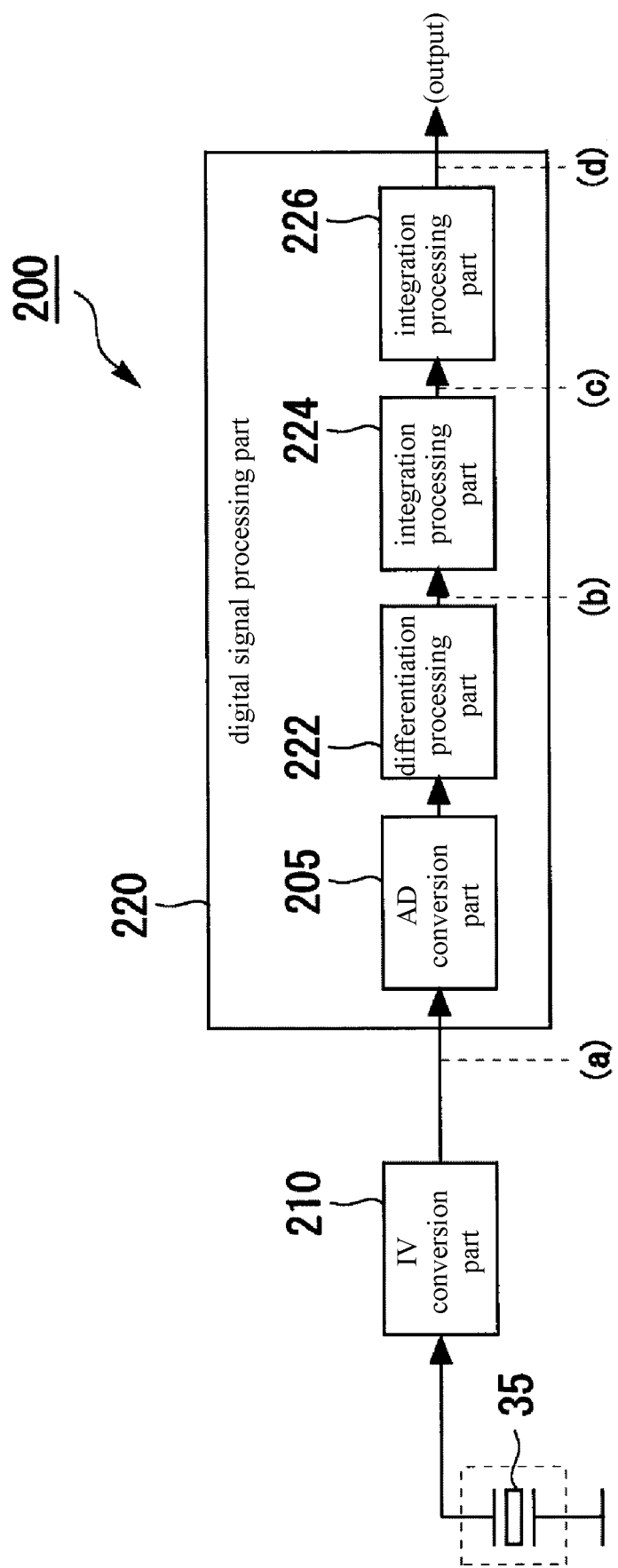
FIG. 3 is a configuration diagram of a pressure detection signal processing device according to a first embodiment.

FIG. 3 is a configuration diagram of the pressure detection signal processing device 200 according to a first embodiment of the disclosure. The pressure detection signal processing device 200 includes a current-voltage conversion part (IV conversion part) 210 and a digital signal processing part 220. In addition, the digital signal processing part 220 includes an AD conversion part 205, a differentiation processing part 222, an integration processing part 224, and an integration processing part 226.

Figure 4:
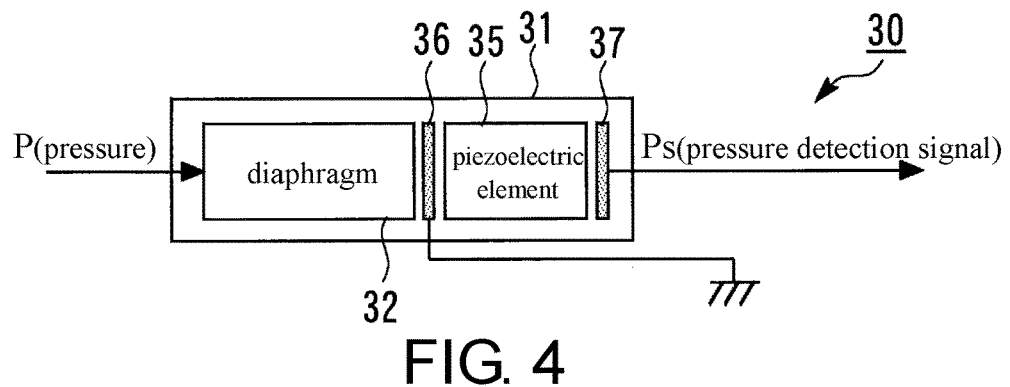
FIG. 4 is a schematic view showing a configuration of a pressure sensor.

FIG. 4 is a schematic configuration diagram of the pressure sensor 30. A diaphragm 32 for receiving a pressure P, a piezoelectric element 35 interposed between a pair of electrodes 36 and 37, and the like are embedded in a columnar housing 31 of the pressure sensor 30. A grounded lead wire is connected to one electrode 36, and a lead wire for transmitting a pressure detection signal ps of the pressure sensor 30 to the next stage is connected to the other electrode 37. The piezoelectric element 35 generates charge corresponding to the intensity of a received pressure and outputs the generated charge. The piezoelectric element 35 is a dielectric material such as zinc oxide (ZnO).

When the diaphragm 32 applies pressure to the piezoelectric element 35 in accordance with the intensity of a received pressure, the piezoelectric element 35 generates a charge corresponding to the applied a pressure and outputs the generated charge to the IV conversion part 210 at the next stage. In this manner, a current corresponding to a pressure P is transmitted to the IV conversion part 210 as a pressure detection signal ps.

Figure 5:
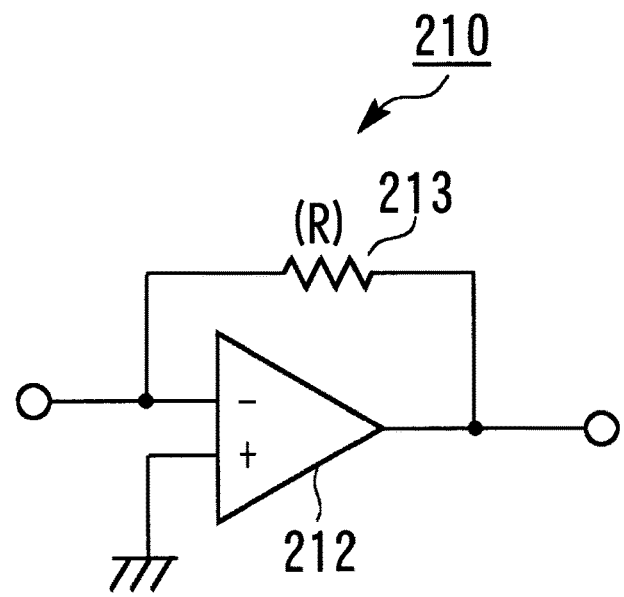
FIG. 5 is a configuration example of a current-voltage conversion part (IV conversion part).

FIG. 5 is a configuration diagram of the IV conversion part 210. The IV conversion part 210 includes an operation amplifier 212 of which a non-inverted terminal is grounded and an inverted terminal and an output terminal are connected by a resistor 213 having a resistance value R1. That is, the operation amplifier 212 is connected in a negative feedback manner by the resistor 213, and the operation amplifier 212 is virtually grounded.

Since an input impedance of the operation amplifier 212 is ideally infinite, a current input to the operation amplifier 212 flows through the resistor 213. In this manner, the IV conversion part 210 converts a current generated in accordance with a charge received from the piezoelectric element 35 into a voltage (IV conversion). Specifically, an absolute value "Va" of a voltage is "Va=I·R1".

In addition, the AD conversion part 205 shown in FIG. 3 converts an analog voltage signal output from the IV conversion part 210 into a digital signal. The differentiation processing part 222 performs differentiation processing on the digital signal having been subjected to analog-digital conversion by the AD conversion part 205. The differentiation processing performed by the differentiation processing part 222 corresponds to sequentially obtaining an inclination of a signal input to the differentiation processing part 222.

When signals at elapsed times "T, 2·T, 3·T, ..., (n−1)·T, and n·T" are set to be "y(1), y(2), y(3), ..., y(n−1), and y(n)" by setting a sampling period of a digital signal obtained by the AD conversion part 205 to be "T", differentiation processing is realized by obtaining "y(2)−y(1), y(3)−y(2), ..., and y(n)−y(n−1)". That is, differentiation processing performed by the differentiation processing part 222 corresponds to sequentially obtaining a difference between digital signals.

The integration processing part 224 performs integration processing on a signal having been subjected to differentiation processing by the differentiation processing part 222. The integration processing performed by the integration processing part 224 is sequentially obtaining and summing the areas of a portion represented by a signal input to the integration processing part 224 and an 0V line in a time width serving as a sampling period. Similarly, the integration processing part 226 further performs integration processing on a signal having been subjected to integration processing by the integration processing part 224. The integration processing performed by the integration processing part 226 is sequentially obtaining and summing the areas of a portion represented by a signal input to the integration processing part 226 and an 0V line in a time width serving as a sampling period.

When signals at elapsed times "T, 2·T, 3·T, ..., (n−1)T, and n·T" are set to be "y(1), y(2), y(3), ..., y(n−1), and y(n)" by setting a sampling period to be "T", integration processing is realized by obtaining "y(1)·T, y(1)·T+y(2)·T, y(1)·T+y(2)·T+y(3)·T, ..., and y(1)·T+y(2)·T+y(3)·T+ ... +y(n)·T". That is, integration processing performed by the integration processing part 224 and the integration processing part 226 corresponds to sequentially obtaining a total sum of digital signals.

In this manner, the digital signal processing part 220 can be realized by a programmable logic device (PLD) such as a field programmable gate array (FPGA). In addition, a CPU (not shown) included in the ECU 100 can also function as the differentiation processing part 222, the integration processing part 224, and the integration processing part 226 by executing a program 132 recorded in the storage part 130.

Operation of First Embodiment

Figure 7A:
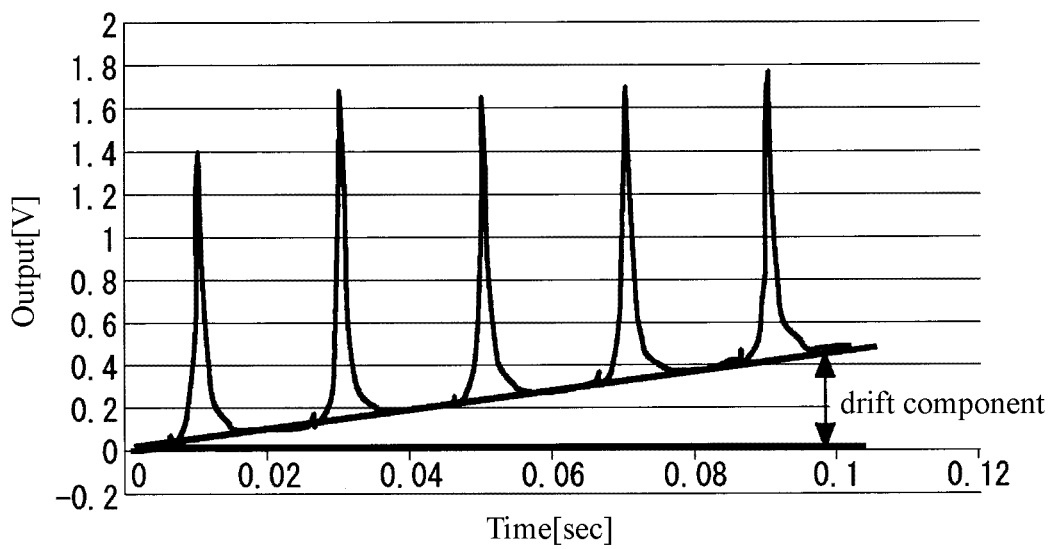
FIGS. 7(a) and 7(b) are diagrams showing outputs of the related art and the IV conversion part.
Figure 7B:
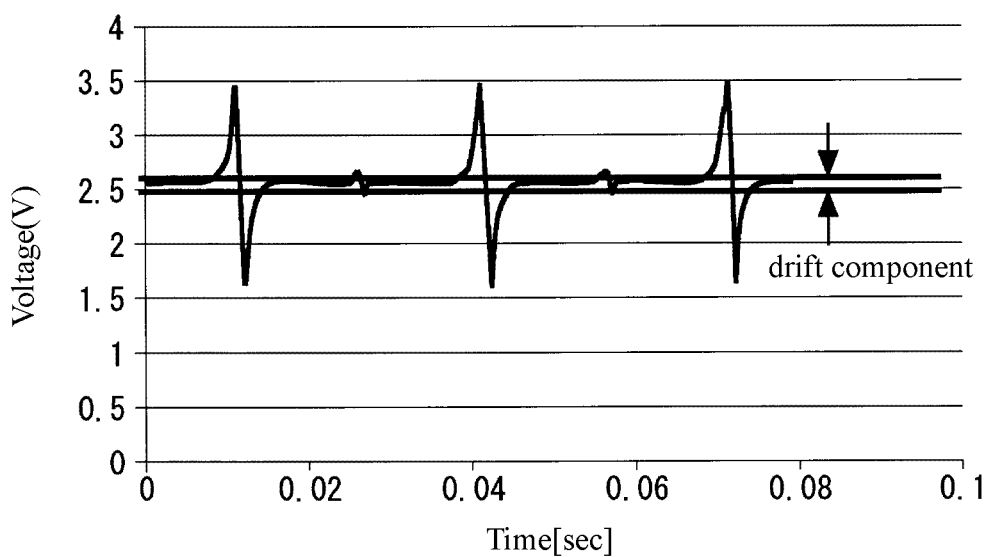

FIG. 7(a) shows an output signal of a charge amplifier which is related art, and FIG. 7(b) shows an output signal of the IV conversion part 210. As shown in FIG. 7(a), the output signal of the charge amplifier includes a drift component. Drift is sequential deviations of an output signal with the elapse of time. A base line of the output signal of the charge amplifier which is related art gradually deviates with the elapse of time due to the influence of drift. Meanwhile, a leakage current is generated due to the influence of a thermal fluctuation, a preload, a pyroelectric function, or the like of the piezoelectric element 35, and the leakage current appears as a drift.

On the other hand, as shown in FIG. 7(b), the output signal of the IV conversion part 210 is an AC-like fluctuation centering on a base line. In the example of FIG. 7(b), a voltage of the base line of the output signal is a voltage obtained by adding a voltage of a drift component to a reference voltage of the IV conversion part 210. Meanwhile, here, an example in which a reference voltage of the IV conversion part 210 is set to 2.5 (V) in order to avoid the output signal being saturated at O V will be described.

Next, an operation of the digital signal processing part 220 will be described with reference to FIG. 8. First, a signal shown in (a) of FIG. 8 is an output signal of the IV conversion part 210 (a signal at a position indicated by a sign "a" in FIG. 3), similar to FIG. 7(b).

Figure 8:
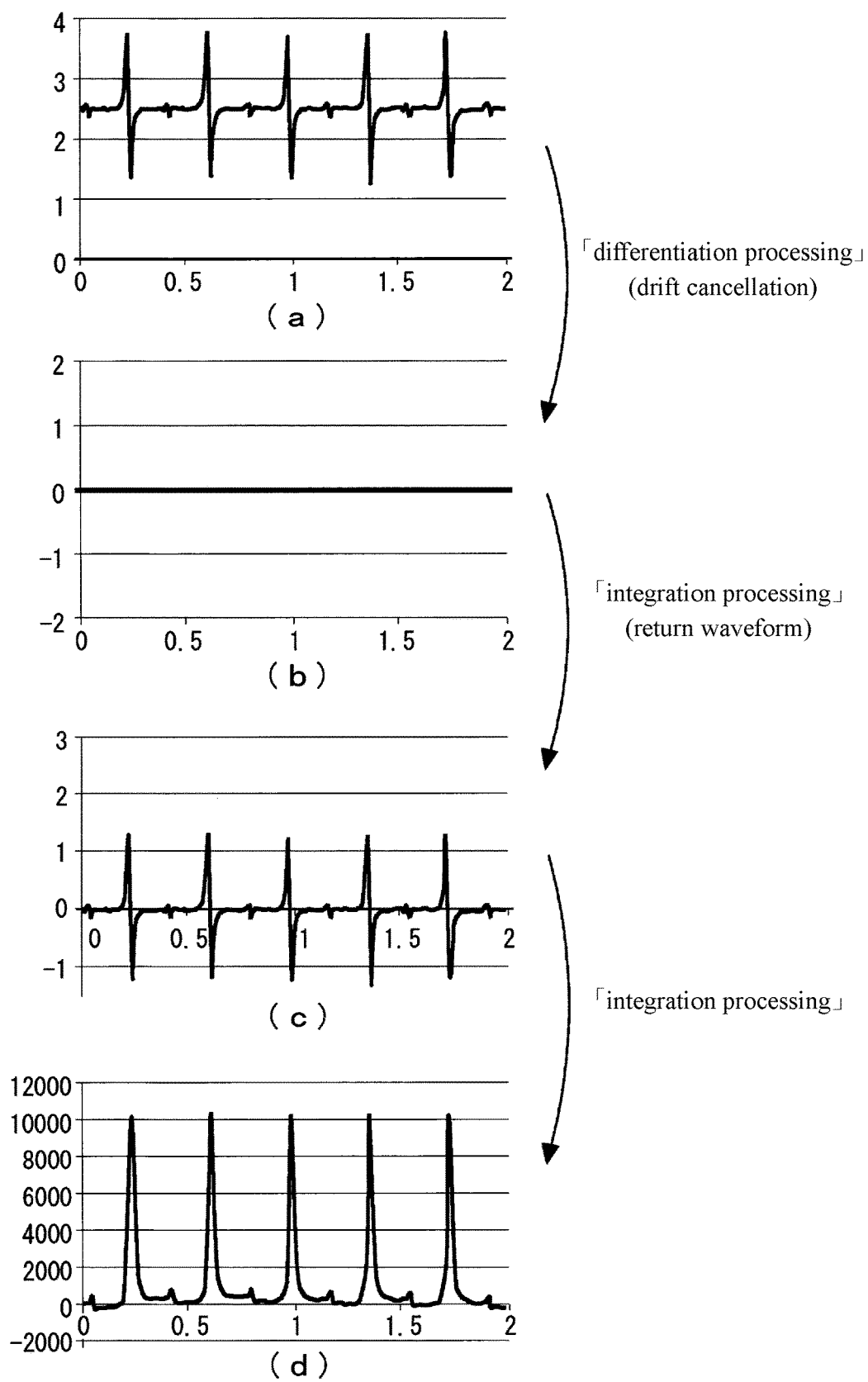
FIG. 8 is a diagram showing an operation of the pressure detection signal processing device.

Subsequently, when the differentiation processing part 222 performs differentiation processing on the signal shown in (a) of FIG. 8, a signal shown in (b) of FIG. 8 is obtained (a signal at a position indicated by a sign "b" in FIG. 3). It is possible to remove an offset from 0 (V) including a drift component through differentiation of the differentiation processing part 222. That is, differentiation processing is performed on a pressure detection signal, so that a portion having no inclination in the pressure detection signal is shifted to 0 (V), and thus it is possible to obtain a pressure detection signal of which a base line is shifted to 0 (V).

Subsequently, like in a signal shown in (c) of FIG. 8, the integration processing part 224 performs integration processing on a signal having been subjected to differentiation processing by the differentiation processing part 222, and thus it is possible to obtain the amount of AC fluctuation in a pressure detection signal before the pressure detection signal is input to the differentiation processing part 222 as shown in (a) of FIG. 8 (a signal at a position indicated by a sign "c" in FIG. 3).

In addition, as shown in (d) of FIG. 8, the integration processing part 226 can further perform integration processing on a signal having been subjected to integration processing by the integration processing part 224, thereby obtaining a signal that can be post-processed by the ECU 100 or the like (a signal at a position indicated by a sign (d) in FIG. 3). That is, integration processing is further performed on an integration signal fluctuating around a base line, thereby obtaining a positive signal of which a signal amplitude is amplified.

Meanwhile, integration processing of the integration processing part 226 is not necessarily required, and the integration processing part 224 that integrates a differentiation signal received from the differentiation processing part 222 once may be provided without providing the integration processing part 226. However, it is preferable to provide the integration processing part 226 in order to improve the accuracy of processing of a pressure detection signal in the engine control part 150. Thus, by obtaining an integrated value in this manner, processing based on a substantial pressure can be performed without being influenced only by a peak value. Here, the processing based on a substantial pressure is, for example, preventing a substantially low pressure from being erroneously recognized as a high pressure even though a peak value is temporarily high.

In the above-described pressure detection signal processing device 200 according to the first embodiment, the IV conversion part 210 converts a current signal corresponding to a charge generated by the piezoelectric element 35 in accordance with a received pressure into a voltage signal. Subsequently, the digital signal processing part 220 performs correction for removing a drift caused by a leakage current of the piezoelectric element 35 on the voltage signal after the IV conversion.

In particular, the differentiation processing part 222 performs differentiation processing on the voltage signal after the IV conversion, and the integration processing part 224 performs integration processing on the signal having been subjected to the differentiation processing, so that it is possible to remove a drift caused by a leakage current and to obtain a high-accuracy pressure detection signal of which a constant base line is maintained.

In addition, high-accuracy processing can be performed by the ECU 100 or the like by performing integration processing by the integration processing part 226, and thus it is possible to control the engine with high accuracy on the basis of an output signal from the pressure detection signal processing device 200.

As described above, according to the pressure detection signal processing device 200 of the first embodiment, a high-accuracy pressure detection signal from which a drift of a piezoelectric element is removed can be obtained with a simple configuration.

Pressure Detection Signal Processing Device 201 According to Second Embodiment (Configuration)

Figure 9:
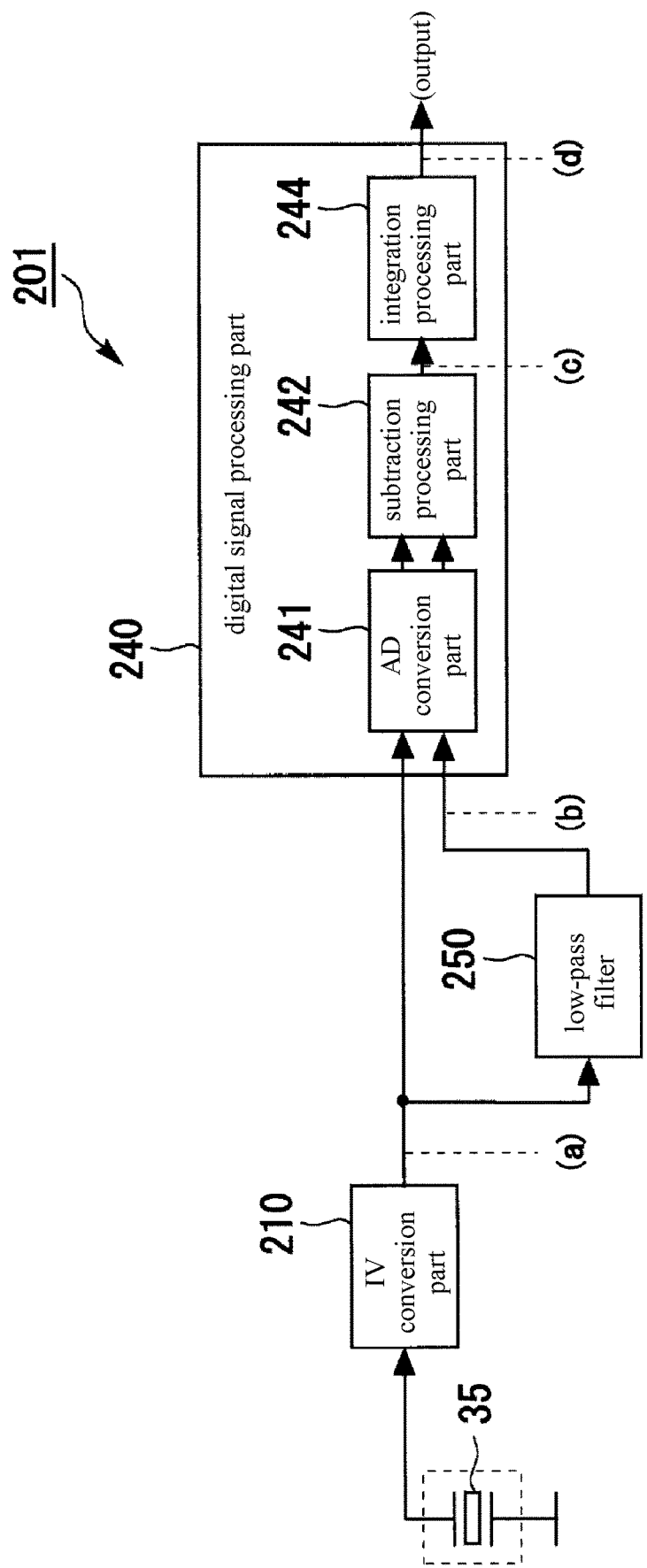
FIG. 9 is a configuration diagram of a pressure detection signal processing device according to a second embodiment.

FIG. 9 is a configuration diagram of a pressure detection signal processing device 201 according to a second embodiment. The pressure detection signal processing device 201 includes an IV conversion part 210, a low-pass filter 250 (extraction part), and a digital signal processing part 240. The digital signal processing part 240 includes an AD conversion part 241, a subtraction processing part 242, and an integration processing part 244.

The IV conversion part 210 converts a current generated in accordance with a charge output from a piezoelectric element 35 in accordance with the intensity of received pressure into a voltage. A specific configuration is the same as that described above with reference to FIG. 5.

Figure 6:
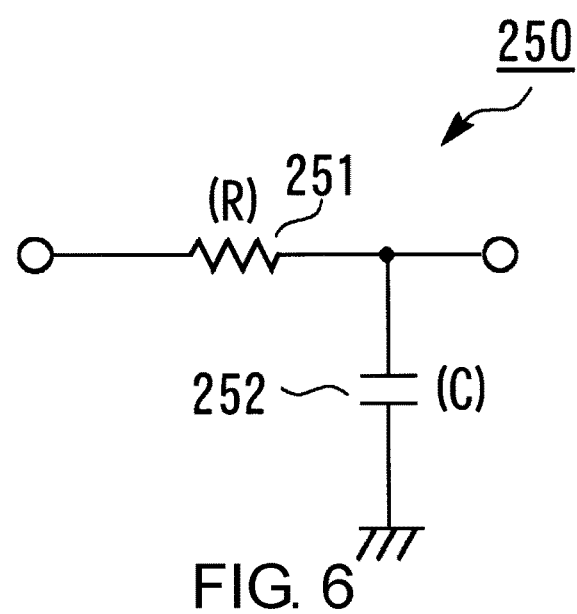
FIG. 6 is a configuration example of a low-pass filter.

The low-pass filter 250 extracts a low-frequency component of an output signal from the IV conversion part 210 and outputs the extracted low-frequency component to the digital signal processing part 240. FIG. 6 shows a configuration example of the low-pass filter 250. The low-pass filter 250 is a type of integration circuit configured to extract outputs from both ends of a capacitor 252 in a circuit in which a resistor 251 having a resistance value R and the capacitor 252 having a capacitance C are connected in series.

When an input and an output of the low-pass filter 250 are respectively set to be "Vin" and "Vout", "Vout/Vin=1/(1+sRC), s=Jω (j is a unit of an imaginary number)" is established, and a "cutoff frequency(fc)" is "fc=1/(2πRC)". Therefore, it is possible to adjust a cutoff frequency by adjusting element values of R and C.

An output signal of the IV conversion part 210 and an extracted signal obtained by extracting a low-frequency component from the output signal by the low-pass filter 250 are input to the AD conversion part 241. The AD conversion part 241 coverts respective analog signals into digital signals. In addition, the subtraction processing part 242 performs arithmetic processing on both the digital signals. Specifically, the subtraction processing part 242 subtracts an output digital signal of the low-pass filter 250 from an output digital signal of the IV conversion part 210 and outputs a subtraction signal equivalent to a subtraction result.

The integration processing part 244 performs integration processing on the subtraction signal output from the subtraction processing part 242. The integration processing performed by the integration processing part 244 is sequentially obtaining and summing the areas of a portion represented by a signal input to the integration processing part 244 and an 0V line in a time width serving as a sampling period.

When signals at elapsed times "T, 2·T, 3·T, . . . , (n−1)·T, and n·T" are set to be "y(1), y(2), y(3), −y(n−1), and y(n)" by setting a sampling period according to the AD conversion part 241 to be "T", integration processing is realized by obtaining "y(1)·T, y(1)·T+y(2)·T, y(1)·T+y(2)·T+y(3)·T, . . . , and y(1)·T+y(2)·T+y(3)·T+ . . . +y(n)·T". That is, integration processing performed by the integration processing part 244 corresponds to sequentially obtaining a total sum of digital signals.

In this manner, the digital signal processing part 240 can be realized by a PLD such as an FPGA, similar to the first embodiment. In addition, a CPU (not shown) included in the ECU 100 can also function as the subtraction processing part 242 and the integration processing part 244 by executing a program 132 recorded in a storage part 130.

In addition, in the configuration example shown in FIG. 9, the analog-type low-pass filter 250 is adopted, but a digital low-pass filter can also be adopted as the low-pass filter 250. The digital low-pass filter can be constituted by, for example, a moving average filter. When signals at elapsed times "T, 2·T, 3·T, . . . , (n−1)·T, and n·T" are set to be "y(1), y(2), y(3), . . . , y(n−2), y(n−1), and y(n)" by setting a sampling period to be "T", the moving average filter is realized by obtaining "(y(1)+y(2)+y(3))/3 (y(n−2)+y(n−1)+y(n))/3)".

That is, the moving average filter sequentially obtains an average value in n digital signals (n is an integer of 3 or greater) positioned before and after and including a digital signal to be noted. When the value of n is set to be a large value, a cutoff frequency can be reduced. For example, the value of n of the moving average filter may be changed linearly in accordance with an engine rotational speed, and thus it is possible to realize stable signal processing irrespective of a peak value.

More specifically, as an example, the engine rotational speed and n can be set to be proportional to each other. Further, in a case where the low-pass filter 250 is constituted by a moving average filter, the low-pass filter 250 can also be provided in the digital signal processing part 240. In addition, a configuration in which an engine rotational speed is obtained from a combustion pressure indicated by a pressure detection signal having been subjected to signal processing by the pressure detection signal processing device 200 can be adopted. In addition, a configuration in which an engine rotational speed is acquired from the engine control part 150 by inputting an engine rotation signal acquired by the engine control part 150 to the pressure detection signal processing device 200 may be adopted.

Operation of Second Embodiment

Figure 10:
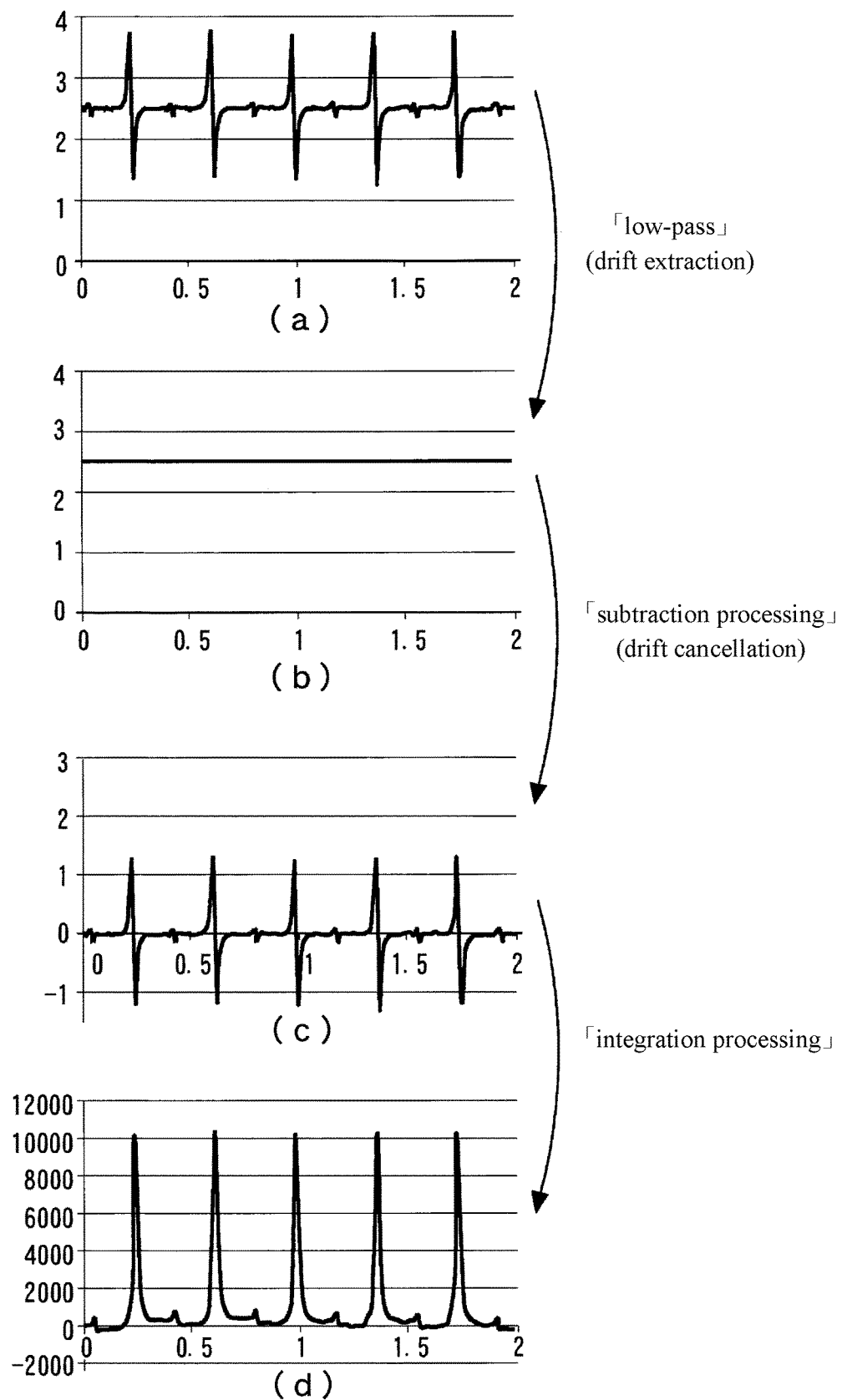
FIG. 10 is a diagram showing an operation of the pressure detection signal processing device.

Next, an operation of the digital signal processing part 240 according to the second embodiment will be described with reference to FIG. 10. (a) of FIG. 10 shows an output signal of the IV conversion part 210 (a signal at a position indicated by a sign "a" in FIG. 9). That is, the signal shown in (a) of FIG. 10 corresponds to the signal shown in (a) of FIG. 8.

Subsequently, when signal extraction in a low frequency band is performed on the signal shown in (a) of FIG. 10 by the low-pass filter 250, a signal shown in (b) of FIG. 10 is obtained (a signal at a position indicated by a sign "b" in FIG. 9). The low-pass filter 250 extracts a drift component from an output signal of the IV conversion part 210. More specifically, the low-pass filter 250 extracts a signal component that changes relatively slowly in an output signal as an offset component from an OV including a drift component.

Subsequently, when the subtraction processing part 242 subtracts an extracted signal extracted by the low-pass filter 250 from an output signal of the IV conversion part 210, a signal shown in (c) of FIG. 10 is obtained (a signal at a position indicated by a sign "c" in FIG. 9). Thereby, it is possible to remove an offset component from an OV including a drift component (drift cancellation), the offset component being incorporated in the output signal of the IV conversion part 210. As a result, the signal shown in (c) of FIG. 10 corresponds to the signal shown in (c) of FIG. 8.

In addition, as shown in (d) of FIG. 10, the integration processing part 244 can perform integration processing on a subtraction signal which is output from the subtraction processing part 242, thereby obtaining a signal that can be post-processed by the ECU 100 or the like (a signal at a position indicated by a sign (d) in FIG. 9). That is, integration processing is performed on a signal fluctuating around a base line, thereby obtaining a positive signal of which a signal amplitude is amplified. As a result, the signal shown in (d) of FIG. 10 corresponds to the signal shown in (d) of FIG. 8.

In the above-described pressure detection signal processing device 201 according to the second embodiment, the IV conversion part 210 performs IV conversion of a current signal corresponding to charge generated by the piezoelectric element 35 in accordance with a received pressure into a voltage signal, and the low-pass filter 250 extracts an offset component including a drift component as a component in a low frequency band of the voltage signal obtained by performing the IV conversion. In addition, the digital signal processing part 240 shown in FIG. 9 performs correction processing for removing a drift caused by a leakage current of the piezoelectric element 35 through digital signal processing on the basis of the voltage signal having been subjected to the IV conversion and an extracted signal including the extracted drift component.

In particular, since the subtraction processing part 242 obtains a subtraction signal indicating a result of a subtraction calculation with respect to the voltage signal and the extracted signal, and the integration processing part 244 performs integration processing on the subtraction signal, a drift is removed, and it is possible to obtain a high-accuracy pressure detection signal of which a constant baseline is maintained. Therefore, in the pressure detection signal processing device 201 according to the second embodiment, high-accuracy processing can be performed by the ECU 100 or the like, and thus it is possible to control the engine with high accuracy on the basis of a pressure detection signal having been subjected to signal processing.

In addition, when a misfire occurs in engine combustion, a combustion pressure is high after the misfire, and thus, for example, an output signal of the differentiation processing part 222 in FIG. 3 can also be utilized for misfire detection. For example, it is possible to perform misfire suppression control by controlling a fuel injection timing in accordance with misfire detection.

As described above, also in the pressure detection signal processing device 201 according to the second embodiment, it is possible to obtain a high-accuracy pressure detection signal from which a drift of a piezoelectric element is removed with a simple configuration.

Further, in the above description, particularly, an example of signal processing to be performed on a pressure detection signal indicating a pressure inside the combustion chamber of the engine 1 has been described. However, the disclosure can be applied not only to a pressure detection signal of a gas but also to pressure detection signals of other pressure receiving mediums such as a liquid. Further, in the engine control system 300 shown in FIG. 1, a configuration in which the pressure detection signal processing device 200 is provided in the ECU 100 has been adopted, but a system configuration in which the ECU 100 and the pressure detection signal processing device 200 are provided as separate bodies and a pressure detection signal having been subjected to signal processing is input to the ECU 100 may be adopted.

In addition, when a processor such as a CPU or a digital signal processor (DSP) executes a program, a signal processing function, a differentiation processing function, a first integration function, a second integration function, a subtraction function, an integration function, and the like are realized by a computer. In addition, the disclosure can also provide a non-transitory recording medium having a program recorded thereon. Examples of the non-transitory recording medium having a program recorded thereon include a semiconductor device such as a ROM, an optical device such as a CD or a DVD, and a magnetic device such as a magnetic disc. The type of recording medium, and the like do not matter as long as a program stored in the recording medium can be executed on a computer by being read using reading means.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pressure detection signal processing device that performs signal processing on an output signal of a pressure sensor comprising a piezoelectric element generating charge according to received pressure, the pressure detection signal processing device comprising:
a current-voltage conversion part which converts a current signal corresponding to the charge into a voltage signal; and
a digital signal processing part which performs correction for removing a drift of the piezoelectric element on the voltage signal through digital signal processing,
wherein the digital signal processing part comprises
a differentiation processing part which performs differentiation processing on the voltage signal,
a first integration processing part which performs integration processing on the signal having been subjected to the differentiation processing, and
a second integration processing part which performs integration processing on the signal having been subjected to the integration processing.

2. The pressure detection signal processing device according to claim 1,
wherein the current-voltage conversion part comprises an operation amplifier which is connected in a negative feedback manner using a resistor.

3. An engine control system, comprising:
the pressure detection signal processing device according to claim 1; and
a control part which controls an engine on the basis of an output signal from the pressure detection signal processing device.

4. A pressure detection signal processing device that performs signal processing on an output signal of a pressure sensor comprising a piezoelectric element generating charge according to received pressure, the pressure detection signal processing device comprising:
- a current-voltage conversion part which converts a current signal corresponding to the charge into a voltage signal;
- an extraction part which extracts a component in a specific frequency band of the voltage signal; and
- a digital signal processing part which performs correction processing for removing a drift of the piezoelectric element through digital signal processing on the basis of the voltage signal and an extracted signal which has been extracted,
- wherein the digital signal processing part comprises
- a subtraction processing part which obtains a subtraction signal indicating a result of a subtraction calculation with respect to the voltage signal and the extracted signal, and
- an integration processing part which performs integration processing on the subtraction signal.

5. The pressure detection signal processing device according to claim 4,
- wherein the extraction part is a low-pass filter that extracts a component in a predetermined low frequency band.

6. The pressure detection signal processing device according to claim 5,
- wherein the low-pass filter is configured such that a resistor and a capacitor are connected to each other in series and is configured to output a voltage from both ends of the capacitor as the extracted signal.

7. The device according to claim 5,
- wherein the digital signal processing part changes a cutoff frequency of the low-pass filter in accordance with a rotational speed of an engine.

8. A non-transitory computer readable medium storing a program for causing a computer to execute following functions:
- for causing a pressure detection signal device that performs signal processing on an output signal of a pressure sensor comprising a piezoelectric element generating charge according to received pressure to realize:
- a signal processing function of performing correction processing for removing a drift of the piezoelectric element on a voltage signal converted from a current signal corresponding to the charge by a current-voltage conversion part,
- wherein the signal processing function comprises
- a differentiation processing function of performing differentiation processing on the voltage signal,
- a first integration function of performing integration processing on the signal having been subjected to the differentiation processing, and
- a second integration function of performing integration processing on the signal having been subjected to the integration processing.

9. A non-transitory computer readable medium storing a program for causing a computer to execute following functions:
- for causing a pressure detection signal device that performs signal processing on an output signal of a pressure sensor comprising a piezoelectric element generating charge according to received pressure to realize:
- a signal processing function of performing correction processing for removing a drift of the piezoelectric element on the basis of a voltage signal converted from a current signal corresponding to the charge by a current-voltage conversion part and an extracted signal obtained by extracting a specific frequency component of the voltage signal,
- wherein the signal processing function comprises
- a subtraction processing function of obtaining a subtraction signal indicating a result of a subtraction calculation with respect to the voltage signal and the extracted signal, and
- an integration function of performing integration processing on the subtraction signal.

\* \* \* \* \*